United States Patent
Zhang et al.

(10) Patent No.: US 6,662,223 B1
(45) Date of Patent: Dec. 9, 2003

(54) PROTOCOL TO COORDINATE NETWORK END POINTS TO MEASURE NETWORK LATENCY

(75) Inventors: Kui Zhang, Cupertino, CA (US); Satyanarayana R. Raparla, San Jose, CA (US); John Lautmann, Freemont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/346,080

(22) Filed: Jul. 1, 1999

(51) Int. Cl.[7] .......................................... G06F 15/173
(52) U.S. Cl. ..................... 709/224; 709/224; 709/238
(58) Field of Search ..................... 709/203, 223–224, 709/238, 240, 229; 370/230–233

(56) References Cited

U.S. PATENT DOCUMENTS

| | | | | |
|---|---|---|---|---|
| 5,781,534 A | * | 7/1998 | Perlman et al. | 370/248 |
| 5,802,106 A | * | 9/1998 | Packer | 370/233 |
| 5,903,735 A | * | 5/1999 | Kidder et al. | 709/240 |
| 6,012,096 A | * | 1/2000 | Link et al. | 709/233 |
| 6,178,160 B1 | | 1/2001 | Bolton et al. | |
| 6,282,575 B1 | * | 8/2001 | Lin et al. | 709/238 |
| 6,286,052 B1 | * | 9/2001 | McCloghrie et al. | 709/238 |
| 6,317,775 B1 | | 11/2001 | Coile et al. | |
| 6,442,608 B1 | | 8/2002 | Knight et al. | |

OTHER PUBLICATIONS

Perlman, Radia, Interconnections: Brideges and Routers: (1992) pp. 185–189.
Request for Comments: 792, "Internet Control Message Protocol" Sep. 1981.

* cited by examiner

Primary Examiner—Hosain T. Alam
Assistant Examiner—Philip B. Tran
(74) Attorney, Agent, or Firm—Cesari and McKenna, LLP

(57) ABSTRACT

The invention provides a control mechanism that enables a destination router to authenticate response time requests issued by a source router before providing the requests to service software for processing. The control mechanism comprises a Network Endpoint Control Protocol (NECP) message format that is exchanged between the source and destination routers when measuring response time throughout the network. The NECP message format encapsulates a Command Length Status Data (CLSD) message that actually holds the response time requests. A collector router issues a novel control message to a responder router over a default responder port. If the responder is enabled for encryption communication, it will decrypt the control message according to the specified key and algorithm. If the responder is not so configured, it will check a conventional ACL to determine whether the client is authorized to communicate with the server. If permitted, the responder then responds to the collector in a manner dependent upon the particular protocol. In the case of a request to enable a UDP port for a particular time period, the responder processes a request and then sends back an acknowledgment to the collector. The collector receives the acknowledgment and then sends out a UDP probe packet to the responder. The responder then "echoes" the packet back to the collector, which keeps the result.

28 Claims, 4 Drawing Sheets

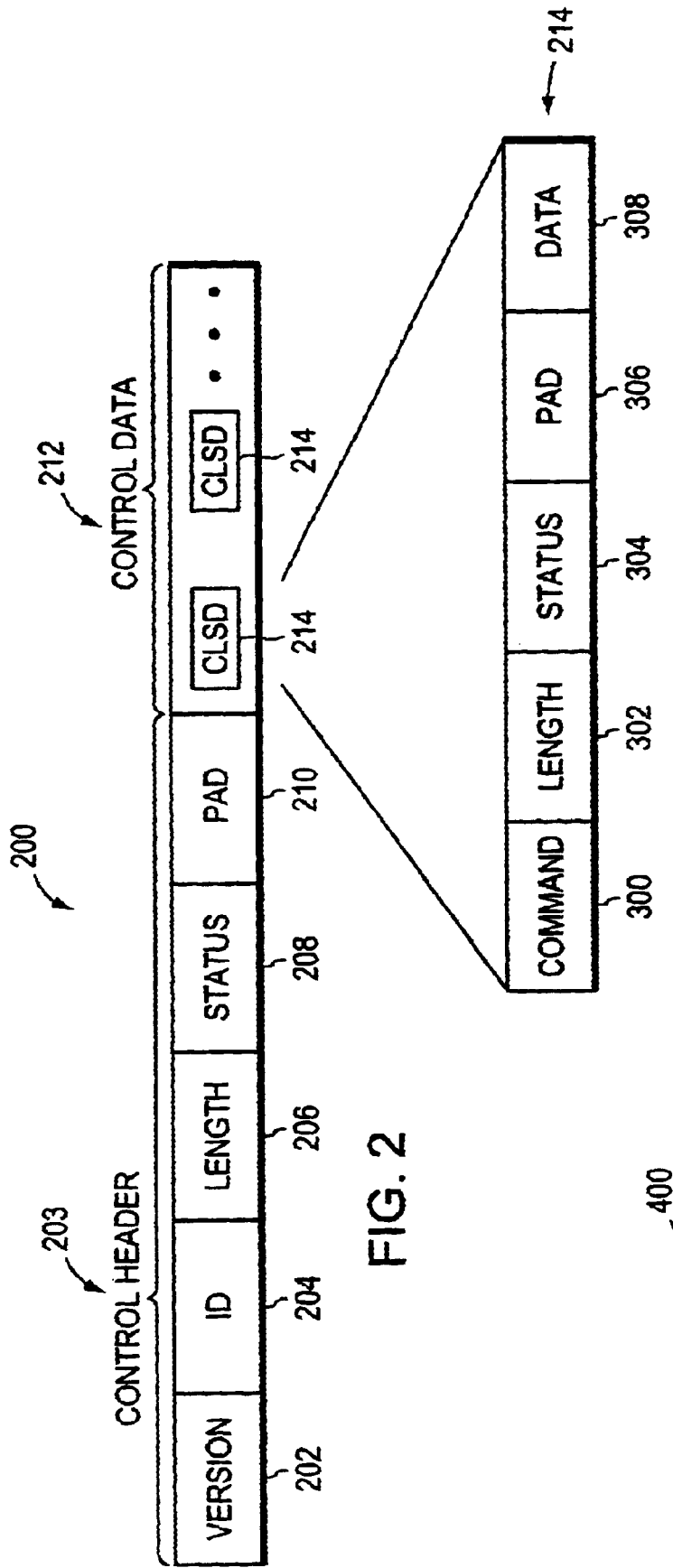

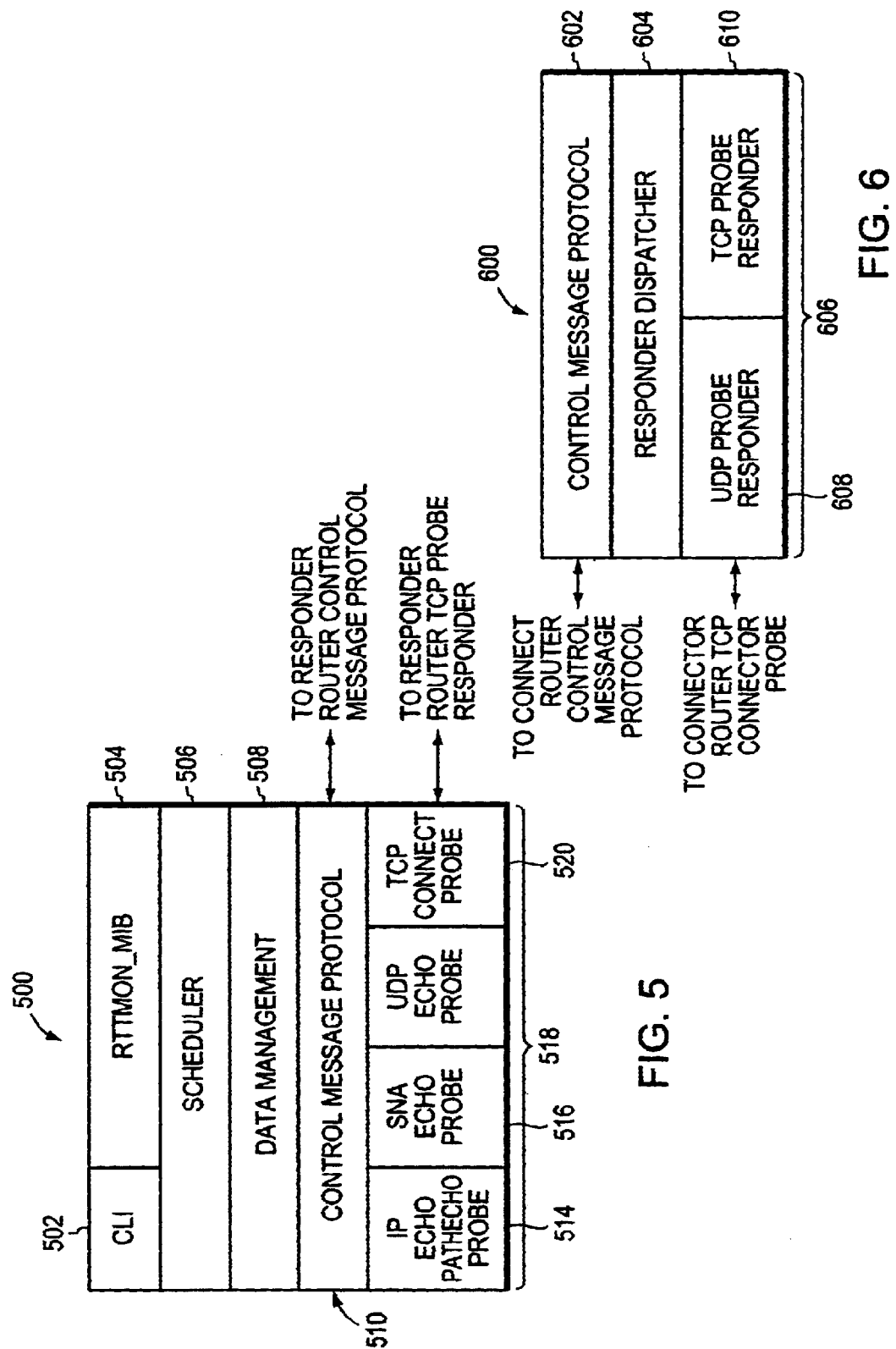

PROTOCOL TO COORDINATE NETWORK END POINTS TO MEASURE NETWORK LATENCY

BACKGROUND OF THE INVENTION

The present invention is directed to measuring response time between end points in a computer network. FIG. 1 is a schematic block diagram of a conventional computer network that includes a local enterprise network coupled to a remote enterprise network via an Internet Service Provider (ISP) domain. The local and remote enterprise networks may comprise autonomous systems such as corporate intranets, where in the local enterprise network includes a source end station ESA and the remote enterprise network includes a destination end station ESB. The ISP domain includes a plurality of routers coupled together by a transmission control protocol/Internet protocol (TCP/IP) network cloud. As shown in FIG. 1, the ISP domain includes a source router 100 (SRC) and a destination router 102 (DSTN) bordering an IP network cloud 104 and interconnected thereto by associated edge routers 103 and 105.

During operation, a user of source end station A (ESA) 106 may realize delays when communicating with destination end station B (ESB) 108 over the ISP domain. The delays may occur in the local enterprise network, the remote enterprise network or at the intermediate ISP domain. Typically, the user will levy a complaint to the Internet service provider and it would desirable for the Internet service provider to diagnose its domain and unequivocally determine whether it is the source of the delays.

Typically, an Internet Control Message Protocol (ICMP) is used to measure response time between end points, such as the source router and destination router, in the ISP domain. The ICMP is described generally on pages 185–189 of the textbook *Interconnections* by Radia Perlman, Addison Wesley Longman, Inc., 1992. In addition, the industry standards hand out entitled "standard RFC 792" describes the Internet Control Message Protocol in detail. The basic format of an ICMP message consists of one byte of message type, one byte of code, two checksum bytes, two bytes of type-specific data, followed by the variable Internet header itself and 64 bits of the problem packet. ICMP message types include: 0=echo reply; 3=destination unreachable; 4=source quench; 5=redirect; 8=echo request; 11=time exceeded; 12=parameter problem; 13=timestamp request; 14=timestamp reply; 15=information request; 16=information reply; 17=address mask request; and 18=address mask reply. The ICMP code message includes: (where type is time exceeded) 0=died in transit and 1=died while being reassembled at the destination; or (where type is destination unreachable) 0=network unreachable; 1=host unreachable; 2=protocol unreachable; 3=port unreachable; 4=fragmentation required but not allowed; and 5=source failed; or (where type is parameter problem) code unused.

The timestamp process entails the request and transmission of time data associated with message receipt. For example, an originate timestamp message is put in by the requester to indicate the most recent known time before transmission of the timestamp request. A receive timestamp message is put in by the replier to indicate the time that the request was received. A transmit timestamp message is put in by the replier to indicate the time at which the reply was transmitted.

The particular type of ICMP message used to measure response time is the echo request (message type=8), which can be used to decide whether some destination is reachable. The destination receiving an echo request is supposed to respond with an echo reply (message type=0). The echo request is also known as a "Ping." To ping a network node means to send an echo request thereto. Ping message exchanges, and the ICMP protocol, are typically used to measure response time because that protocol and those messages are services readily available to all devices in a TCP/IP network. That is, ICMP is an integral part of the Internet Protocol (IP) and implemented by every IP module in any IP device. Ping is an operation based on ICMP, and thus, is available on all machines. Therefore, Ping messages are typically used to measure response time in an ISP domain in response to customer complaints with respect to service.

A disadvantage associated with the use of Ping messages as a means for measuring network response time in the ISP domain is that the ICMP is not representative of the client's application protocol that manifests the latencies/delays. For example, the customer may be running a Domain Name Service (DNS) or a Simple Network Management Protocol (SNMP) application when they latencies manifest. These application protocols typically run over a transport such as the User Datagram Protocol (UDP). Another application may be the Hypertext Transfer Protocol (HTTP) that generally runs over the Transmission Control Protocol (TCP) transport of the Internet Protocol (IP) stack. In general, there are more latencies associated with the UDP and TCP protocol communications because of the processing required in the end points when implementing such features as quality of service (QOS). Therefore, it is desirable to measure the response time between router end points in the ISP domain using a protocol that is similar to the protocol used by a customer, such as UDP or TCP.

When using these transport protocols to communicate with a destination, the source end station generally specifies a particular port in the destination for receiving and responding to a request from the source. In order to effect such transport protocol communication, certain software processes must be running on the destination end station. Typically, the destination end station is a server located in the remote enterprise network and the source end station is a client located in the local enterprise network. The software running on the server that is required to effect transport communication is typically a server process (otherwise known as a responder) that is configured to "listen" on a particular port in order to receive requests from the client. For example, in the case of a DNS application running over EDP, the DNS server process running on a destination end station listens on standard router Port 53 in order to service any DNS requests.

The responder server processes are generally not running on the destination in source routers in the ISP domain. Yet in order for the Internet Service Provider to accurately diagnosis the response time in its domain, it is desired for the ISP to emulate the UDP transaction between the source and destination routers in the ISP domain. That way, the ISP can determine whether there is any latencies between the source and destination router end points that are configured to utilize the same protocol, quality of service and ports as the client and server end stations on the local and remote enterprise networks. Accordingly, the server process software must be installed on the destination router so that the destination router can respond to the service request using the UDP transport protocol. More specifically, if the client is having a problem on, for example, Port 53, it is desirable to emulate Port 53 on the destination of the ISP domain. The server process (responder software) must be running and listening on Port 53 in the destination router in order to respond to the UDP request from the source router in the ISP domain.

A problem with manually configuring the routers with the appropriate software is that these processes would be constantly running in the routers for an extended period of time; this could lead to disruption of service (denial of service attacks) on the routers by unauthorized interlopers, e.g. "hackers." The present invention is directed to solving this problem and, in particular, to a technique for dynamically invoking a responder process on a destination router of the ISP domain.

SUMMARY OF THE INVENTION

The present invention is directed to a control mechanism that enables a destination router to authenticate response time requests issued by a source router before providing the requests to service software for processing. The control mechanism comprises a Network Endpoint Control Protocol (NECP) message format that is exchanged between the source and destination routers when measuring response time throughout the network. The NECP message format encapsulates a Command Length Status Data (CLSD) message that actually holds the response time requests.

Specifically, a NECP control protocol message is generated by a "client" source router and transmitted to a "server" destination end router to, among other goals, begin listening on a particular port. For purposes of the present invention, the source router entity is called a "collector" and the destination router entity is called a "responder." Preferably, there are responder "daemon" processes running in various routers of the ISP domain, e.g. all edge routers. Broadly stated, the collector issues an NECP control message to the responder, instructing the responder to listen on a particular port (e.g. Port #53). The control message also includes a request for the responder to initiate a server process running the UDP protocol and, of course listening on Port 53. Note that there is a default port that the responder is initially configured to listen on to receive the NECP control message. In the illustrative embodiment described herein, the default port is referred to as a "responder port" and has a port number 1967. If there is a responder configured on the destination router, the responder receives the control message request and starts up a UDP server process configured to listen on Port 53. The client request may further specify a time interval (e.g. 30 seconds), within which the UDP port will be enabled. That is, the novel protocol enables specification of a discrete time period during which the UDP server is running on a particular port to thereby obviate misuse by intruders. Furthermore, in order to insure authentication of the message exchange, the entire NECP control message may be converted into a secure form using a particular encryption, scrambling or hashing algorithm—for example, the conventional MD5 hashing checksum algorithm. According to the invention, such encryption is optional. Therefore, an encryption enabler function is provided to configure the responder for receiving encrypted messages. If it is so enabled, the responder port is pre-configured with an appropriate key to decrypt/verify the message according to the MD5 algorithm.

Note that the control message can specify either a UDP port or a TCP port on which the responder should listen. In the case of a UDP port request from the collector, the responder replies with the UDP (probe entering packet returned to the collector). If the request is to listen on a TCP port, the responder accepts the incoming TCP connection. Note also that if the encryption authentication mechanism is not enabled, the responder will utilize conventional Access Control Lists (ACL) in, for example, look-up table format, to determine whether or not a particular client is authorized to transmit on the port 1967. In addition, the specified time interval within the control message should be sufficient to enable response time measurements between the collector and responder.

In summary, a collector will issue a novel control message to a responder over a default responder port in accordance with the present invention. If the responder is enabled for encryption communication, it will decrypt the control message according to the specified key and algorithm. If the responder is not so configured, it will check a conventional ACL to determine whether the client is authorized to communicate with the server. If the client is authorized or if the message is successfully decrypted, the responder interprets the message as instructions for starting up a particular port according to a particular protocol (TCP or UDP) and for a specified time period. The responder then responds to the collector in a manner dependent upon the particular protocol. In the case of a request to enable a UDP port for a particular time period, the responder processes a request and then sends back an acknowledgment to the collector. The collector receives the acknowledgment and then sends out a UDP probe packet to the responder. The responder then "echoes" the packet back to the collector, which keeps the result. In the case of enabling a TCP port connection, instead of sending a UDP probe packet, the collector sends a TCP connect probe packet to establish a TCP connection to the destination router. A TCP connect probe measures the time for the connection to be established and completed, and essentially, measures "virtual circuit" availability. In either case, the responder disables the port after it replies to the probe packet. In addition, the responder disables the port when the response period expires. The disabling feature of the present invention is a security measure intended to prevent unauthorized use of a responder port.

BRIEF DESCRIPTION OF THE DRAWINGS

The invention Description below refers to the accompanying drawings, of which:

FIG. 2 is a block diagram of the novel Network Endpoint Control Protocol (NECP) control message applicable to the network of FIG. 1 according to this invention;

FIG. 3 is block diagram of a Command Length Status Data (CLSD) sub-message format in that forms part of the control data of the message of FIG. 2;

FIG. 4 is a block diagram of an Internet Protocol (IP) packet including a User Datagram Protocol (UDP) header;

FIG. 5 is a block diagram of collector router architecture according to this invention;

FIG. 6 is a block diagram of a responder router architecture according to this invention.

DETAILED DESCRIPTION OF AN ILLUSTRATIVE EMBODIMENT

Figure 1:
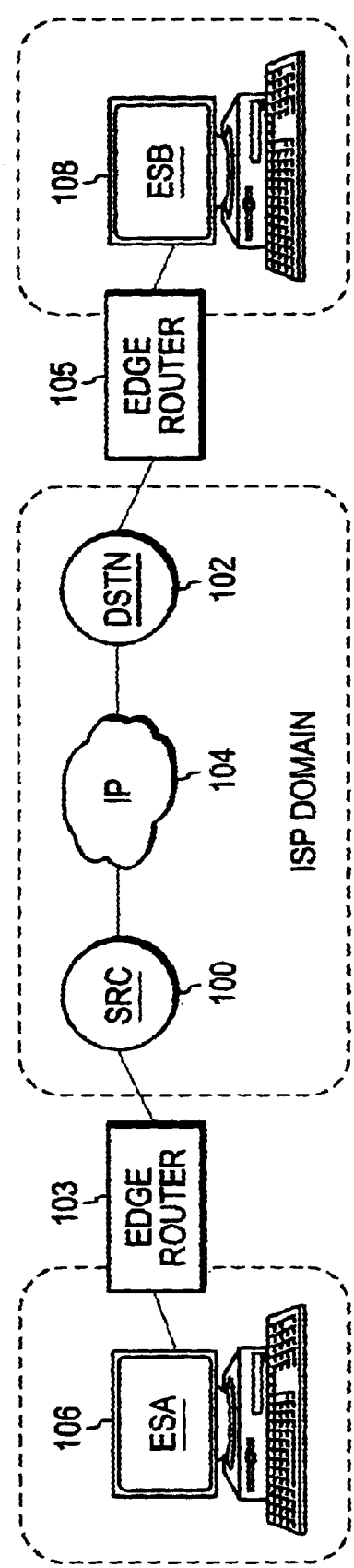
FIG. 1 is a block diagram of a largely conventional computer network including remote and local enterprise networks coupled via an Internet Service Provider domain in accordance with prior art.

FIG. 2 is a schematic block diagram showing the format of a novel Network Endpoint Control Protocol (NECP)

control message 200 for authenticating users according to a preferred embodiment of this invention. The control message 200 includes a version field whose contents specify the version number 202 of the control protocol message 203 and an identification (ID) field 204 whose contents uniquely identifies each request/response transaction by a router (refer to FIG. 1). A length field 206 contains an indication of the total length of the control message, and a status field 208 contains information specifying the status of the request. Note that the status field is loaded by the responder and includes the following status codes: RTT_OK (request successful), RTT_AUTH_FAIL (authentication failure) and RTT_FAIL (request failure). A pad field 210 contains padding information needed to align the header and, finally, a control data field 212 includes command, length, status and data (CLSD) packets 214 that carry the commands to be executed by the responder.

FIG. 3 is a schematic block diagram showing the detailed format of the CLSD field 214, which includes a command field 300 whose contents specify a command code (type) for the responder operations. In addition, the CLSD field includes a length sub-field 302 that specifies a total length of the CLSD field and a status sub-field 304 whose contents include a two-byte error code if the responder cannot process the CLSD. An example of an error code is RTT_FAIL (command failure). A pad subfield 306 is also provided that contains padding information needed to align the CLSD field header. The last sub-field of the CLSD field is a data field 308, which contains variable length data for the particular command. In addition the following exemplary structures are employed with reference also to the MD5 hashing checksum algorithm (to be described further below):
1. Authentication CLSD: Command=RTR_AUTH; Data: struct{uchar mode; /*authentication method used, currently only MD5*/uchar key_id; uchar info[16]; /*actual MD5 digest*/uchar pad[2]};
2. UDP Port Enable CLSD: Command=RTR_UDP_PORT_ENABLE; Data: struct{ipaddrtype dest; ushort port; ushort duration; /*port enabled for how long */}; and
3. TCP connect port enable CLSD: Command=RTR_TCPCONN_PORT_ENABLE; Data: struct{ipaddrtype dest; ushort port; ushort duration;}.

Note that the control message format of FIG. 2 includes a control header portion 203 (including: Version, ID, Length, Status and Pad) along with a control data portion 212. Moreover, the control data portion 212 may contain multiple CLSD fields 214 or submessages, wherein each CLSD sub-message has a format as shown in FIG. 3. The control data portion or "payload" of the control message format includes multiple CLSD messages because there may be situations where the collector sends multiple data items to the responder. An example of this would be in the case of starting up a UDP port wherein the collector specifies a port number, a time interval in which the port will be active, the data size supported for each request from the collector to the responder, and the data size supported for each response from the responder to the collector. Each of these data items is included in a separate CLSD message, and in particular in the data portion of a CLSD message.

In accordance with the present invention, the novel control message formats and exchanges are employed to measure network latency response time between two end points in a network, wherein the end points are routers that are emulating protocols being executed by source and destination end stations. In this context, the network configuration of FIG. 1 maybe advantageously used when describing operation of the inventive protocol and message exchanges. Significantly, the inventive messages and exchanges enable collector and, more specifically responder software processes resident on the routers (103 and 105) to be dynamically invoked for purposes of measuring response time, thereby obviating the requirement of statistically configuring the routers to have these processes running for an extended period of time.

Operation of the inventive protocol and message exchange will now be described. The responder is initially enabled on a target destination router within an ISP domain to listen on, e.g., a UDP port such as Port 1967. The responder may be optionally configured with an MD5 hashing checksum key chain to use for any CP control message authentication. After enablement, the responder is able to receive the NECP control messages.

The collector constructs a command CLSD based on a particular probe type. If configured for authentication, the collector creates an authentication CLSD that contains an MD5 digest of the message. The source router sends out both CLSDs and one UDP datagram to the responder. If MD5 authentication is not configured, only one command CLSD is sent. Note that the CLSDs are encapsulated within the NECP control message (see FIGS. 2 and 3).

Upon receiving the control message, the destination router responder verifies authentication of the message if authentication is configured. If not, the responder insures that the collector has rights to access the port by scanning an ACL list. If either mode fails, the responder returns an authentication failure message (e.g. a message with status set to, for example, RTT_AUTH_FAIL) if authentication does not fail, the responder processes the control message by going through each CLSD in the control message one by one. That is, the responder starts up a server process in accordance with the data items (perimeters) sent by the collector in the control message. For example, the responder will set up a UDP server that listens on a particular port (Port 53) for a particular time period (5 seconds) and that server will accept a particular data size (10 bytes) from the collector and will return a particular data size (100 bytes) to the collector.

While individually processing the CLSD in the control message, the responder may encounter a CLD that it can not process. In that case, it returns a control message to the collector containing the original header and the failed CLSD with status set to the appropriate error code. However, if the responder is able to process all of the CLSDs, it sends back a control message containing just the header of the original message, with the status of the header set to "RTT_OK."

When the collector receives the RTT_OK response, it sends out a probe packet to the responder. This probe packet is the "data" message used to measure response time in the network. In the case of EDP, a UDP probe packet is timestamped at the collector prior to transmission to the responder and it likewise timestamped at the responder upon reception of the message. Note that the timestamp occurs at the point of reception at the router and prior to any processing of the message by the router. The responder then "responds" to the collector by timestamping the UDP packet at the point of transmitting it over the network ("when echoing" the message) and upon receiving the message, the collector likewise timestamps the echoed response. As a result, the collector can calculate the delta (difference) in timestamps to determine an accurate measurement of network response time. Note that the probe packet is a conventional IP data packet that is sent over the UDP transport in accordance with the EDP protocol.

FIG. 4 is a schematic block diagram of an IP packet 400 including an IP header 402, a UDP header 404 and a data field 406. Note that the data field 406 represents the payload of the UDP packet and that field is used for accommodating the timestamp when measuring network latencies and response times. In the illustrative embodiment, the timestamps are maintained locally at the collector and responder routers. That is, those routers calculate the differences between when the packets are received and transmitted and, accordingly, only the differences (delta) timestamps are stored in the payload of the UDP packet. Note that actual measurement technique (probe packet) is not part of the current invention. That is, the invention pertains to the control message format in exchange used to coordinate the end points by conforming the destination of the particular protocol being employed along with the port number and time interval within which the ports should be operational. Thus, the invention pertains to a network end point control (or coordination) protocol that has the acronym NECP.

FIG. 5 is a schematic block diagram illustrating the architecture of a collector router 500 in accordance with the present invention. The architecture is depicted in the form of a protocol stack having a plurality of layers or processes that perform specific network operations and functions. For example, the collector protocol stack includes a command line interface (CLI) process 502 and a management information base (MIB) process 504 functioning at a high level layer of the stack. The collector further includes conventional scheduling and management processes 506 and 508, respectively, operating within respect of layers of the stack. In accordance with the invention, a novel control message protocol layer 510 is provided that contains a collector process for generating novel NECP control messages. In addition, the collector protocol stack includes a plurality of processes 512 for generating probe packets in accordance with particular transports (such as UDP and TCP). According to this embodiment these processes particularly include an IP echo probe 514, an SNA echo probe 516, a UDP echo probe 518 and a TCP connect probe 520.

FIG. 6 is a schematic block diagram of the architecture of a responder router 600 in accordance with the invention. The responder also includes a novel control message protocol layer 602 having a particular responder process for responding to NECP control messages in accordance with the invention. A dispatcher layer 604 transfers messages. In addition, the responder includes a plurality of probe responder processes 606, one for each transport. These processes include a UDP probe responder 608 and a TCP responder 610. The responder according to alternate embodiments can likewise, services other transport protocols.

Figure 7:
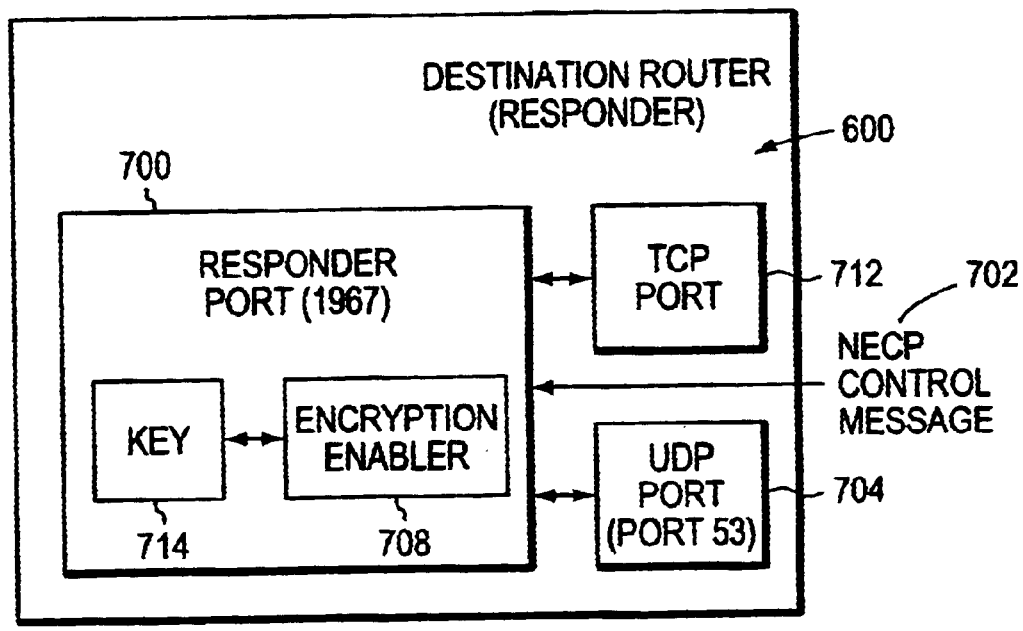
FIG. 7 is a block diagram of a responder port architecture including an encryption enabler according to this invention.

With reference generally to FIG. 7, in summary, the collector issues an NECP control message to the responder, instructing the responder to listen on a particular port (e.g. Port 53). The control message also includes a request for the responder to initiate a server process running the UDP protocol and, of course listening on Port 53. Note that there is a default "responder" Port 1967 (700) that the responder is initially configured to listen on to receive the NECP control message 702. If there is a responder configured on the destination router, the responder receives the control message request and starts up a UDP server process configured to listen on Port 53 (704). The client request may further specify a time interval (e.g. 30 seconds), within which the UDP port 704 will be enabled. That is, the novel protocol enables specification of a discrete time period within which the UDP server is running on a particular port to thereby obviate misuse by intruders. Furthermore, in order to insure authentication of the message exchange, the entire NECP control message may be encrypted or hashed with a particular algorithm—for example, the conventional MD5 hashing checksum algorithm. According to the invention, such encryption/hashing is optional. Therefore, an encryption enabler function 708 is provided to configure the responder for receiving encrypted messages. Note that the term "encryption, as used herein is expressly meant to encompass a variety of secure transmission techniques including traditional encryption, such as DES and the preferred hashing/checksum technique such as MD5. In the case of MD5, the subject message is hashed into a sequence of characters at the transmitting end, and then "verified" at the receiving end so as to be readable. The term "decryption," as used herein shall be taken to include this verification function. If "encryption" is so enabled, the responder port is pre-configured with an appropriate key to verify the message according to the preferred MD5 algorithm.

Note that the control message can specify either a UDP port 704 or a TCP port 712 on which the responder should listen. In the case of a UDP port request from the collector, the responder replies with the UDP (probe entering packet returned to the collector). If the request is to listen on a TCP port, the responder accepts the incoming TCP connection. Note also that if the encryption authentication mechanism is not enabled, the responder will utilize conventional Access Control Lists (ACL) in, for example, look-up table format, to determine whether or not a particular client is authorized to transmit on the port 1967. In addition, the specified time interval within the control message should be sufficient to enable response time measurements between the collector and responder. With further reference to FIG. 7, the collector will issue a novel control message to the responder 600 over a default responder port 700 in accordance with the present invention. If the responder is enabled for encryption communication, it will decrypt the control message according to the specified key retrieved from storage 714 and encryption/decryption algorithm resident in the responder. If the responder is not so configured, it will check a conventional ACL (not shown) to determine whether the client is authorized to communicate with the server. If the client is authorized or if the message is successfully decrypted, the responder interprets the message as instructions for starting up a particular port according to a particular protocol (TCP or UDP) and for a specified time period. The responder then responds to the collector in a manner dependent upon the particular protocol. In the case of a request to enable a UDP port for a particular time period, the responder processes a request and then sends back an acknowledgment to the collector. The collector receives the acknowledgment and then sends out a UDP probe packet to the responder. The responder then "echoes" the packet back to the collector, which keeps the result. In the case of enabling a TCP port connection, instead of sending a UDP probe packet, the collector sends a TCP connect probe packet to establish a TCP connection to the destination router. A TCP connect probe measures the time for the connection to be established and completed, and essentially, measures "virtual circuit" availability. In either case, the responder disables the port after it replies to the probe packet. In addition, the responder disables the port when the response period expires. The disabling feature of the present invention is a security measure intended to prevent unauthorized use of a responder port.

A requirement of coordinating end point in order to measure network latency and response time is that a server process must be spawned and started up at each port for which communication will take place. An advantage of the present invention is that a collector can dynamically invoke a server process at a particular port for a particular time interval, to thereby avoid unauthorized use of those ports by intruders. Another advantage of the invention is that it is not limited to just edge routers of an ISP domain. That is the inventor protocol and message exchange can be utilized between any two routers within any segment of the network. However, the invention is particularly useful for ISP providers because they can isolate their portion of the network from their customers' networks and be able to diagnosis any bottlenecks or problems that are the ISP responsibility.

The foregoing has been a detailed description of a preferred embodiment of the invention. Various modifications and additions can be made without departing from its spirit and scope. For example, a variety of transports and protocols aside from those specifically enumerated can be employed according to an alternate embodiment. Additional routers and switching layers can be implemented in a network configured according to this invention. Finally, the functional blocks and associated procedures described herein are expressly contemplated as being implemented in electronic hardware, computer readable media (software) or a combination of hardware and software. Accordingly, this description is meant to be taken only by way of example.

What is claimed is:

1. A method for authenticating response time requests issued from a source router by a destination router comprising the steps of:

receiving, at a default responder port of the destination router, a control protocol message sent by the source router, the message comprising a Network Endpoint Connection Protocol (NECP) message encapsulating a Command Length Status Data (CLSD) message therein, and when the NECP message is unencrypted, accessing an Access Control List (ACL) to determine whether a specified client is authorized, based upon information in the ACL, to utilize the default responder port, and in response to receipt of the CLSD message, initiating, at the destination router, a listening process at a predetermined port thereon, the listening process including enabling a User Datagram Protocol (UDP) server process at the predetermined port;

establishing a time limit for receiving a server request at the predetermined port at which time the predetermined port is enabled; and receiving the server request at the predetermined port when the server request is received while the predetermined port is enabled.

2. The method as set forth in claim 1 wherein the step of establishing includes instructing, from a client, in communication with the destination router, the time interval within which the UDP server process is active.

3. The method as set forth in claim 1 wherein the step of transmitting the NECP message includes transmitting an encrypted NECP message and decrypting the encrypted NECP message at the destination router.

4. The method as set forth in claim 3 wherein the step of decrypting includes accessing a decryption key provided based upon an encryption enabler associated with the destination router.

5. The method as set forth in claim 1 wherein the step of initiating the listening process includes accepting Transmission Control Protocol (TCP)-format message at the predetermined port, the predetermined port being adapted to accept a TCP-format message thereat.

6. A method for authenticating response time requests issued from a source router by a destination router comprising the steps of:

receiving, at a default responder port of the destination router, a control protocol message sent by the source router, the message comprising an encrypted Network Endpoint Connection Protocol (NECP) message encapsulating a Command Length Status Data (CLSD) message therein, the NECP message having an MD5 format hashing checksum procedure, and in response to receipt of the CLSD message, decrypting, at the destination router, the encrypted NECP message by applying an MD5 format verification procedure to the message, and initiating, at the destination router, a listening process at a predetermined port thereon, the listening process including enabling a User Datagram Protocol (UDP) server process at the predetermined port;

establishing a time limit for receiving a server request at the predetermined port at which time the predetermined port is enabled; and receiving the server request at the predetermined port when the server request is received while the predetermined port is enabled.

7. A network router that authenticates a received response time request issued from a source as a control protocol message, the message comprising a Network Endpoint Connection Protocol (NECP) message encapsulating a Command Length Status Data (CLSD) message therein, comprising:

a default responder port of the router that receives the control protocol message and, in response thereto, initiates, at the destination router, a listening process at a predetermined port on the router arranged to execute a User Datagram Protocol (UDP) server process;

a timer that establishes a time limit for receiving a server request at the predetermined port at which time the predetermined port is enabled;

means for receiving the server request at the predetermined port when the server request is received while the predetermined port is enabled; and means for accessing an Access Control List (ACL), when the NECP message is unencrypted, to determine whether a specified client is authorized, based upon information in the ACL, to utilize the default responder port.

8. The router as set forth in claim 7 further comprising a client, in communication with the, for instructing the time interval within which the UDP server process is active.

9. The router as set forth in claim 8 wherein the control protocol message comprises an encrypted NECP message.

10. The router as set forth in claim 9 further comprising a decryption key provided to the router for decrypting the NECP message based upon an encryption enabler associated with the destination router.

11. The router as set forth in claim 7 wherein the default responder port is constructed and arranged to accept a Transmission Control Protocol (TCP)-format message at the predetermined port.

12. A network router that authenticates a received response time request issued from a source as a control protocol message, the message comprising an encrypted Network Endpoint Connection Protocol (NECP) message encapsulating a Command Length Status Data (CLSD) message therein, comprising:

a default responder port of the router that receives the control protocol message and, in response thereto, initiates, at the destination router, a listening process at a predetermined port on the router arranged to execute a User Datagram Protocol (UDP) server process;

a decryption key provided to the router for decrypting the NECP message based upon an encryption enabler associated with the destination router;

a timer that establishes a time limit for receiving a server request at the predetermined port at which time the predetermined port is enabled; and means for receiving the server request at the predetermined port when the server request is received while the predetermined port is enabled.

13. The router as set forth in claim 12 further comprising a client, in communication with the, for instructing the time interval within which the UDP server process is active.

14. The router as set forth in claim 13 wherein the control protocol message comprises an encrypted NECP message.

15. The router as set forth in claim 14 further comprising a decryption key provided to the router for decrypting the NECP message based upon an encryption enabler associated with the destination router.

16. The router as set forth in claim 12 wherein the default responder port is constructed and arranged to accept a Transmission Control Protocol (TCP)-format message at the predetermined port.

17. A computer readable medium containing program instructions for:

receiving, at a default responder port of a router, a control protocol message, the message comprising a Network Endpoint Connection Protocol (NECP) message encapsulating a Command Length Status Data (CLSD) message therein, and in response thereto, initiating, at the router, a listening process at a predetermined port thereon, the listening process including enabling a User Datagram Protocol (UDP) server process at the predetermined port;

establishing a time limit for receiving a server request at the predetermined port at which time the predetermined port is enabled;

receiving the server request at the predetermined port when the server request is received while the predetermined port is enabled; and accessing an Access Control List (ACL) when the NECP message is unencrypted to determine whether a specified client is authorized, based upon information in the ACL, to utilize the default responder port.

18. The computer readable medium as set forth in claim 17 wherein the instruction for establishing includes instructing, from a client, in communication with the router, the time interval within which the UDP server process is active.

19. The computer readable medium as set forth in claim 17 wherein the instruction for transmitting the NECP message includes transmitting an encrypted NECP message and decrypting the encrypted NECP message at the destination router.

20. The computer readable medium as set forth in claim 19 wherein the instruction for decrypting includes accessing a decryption key provided based upon an encryption enabler associated with the router.

21. A computer readable medium containing program instructions for:

receiving, at a default responder port of a router, a control protocol message, the message comprising an encrypted Network Endpoint Connection Protocol (NECP) message encapsulating a Command Length Status Data (CLSD) message therein, the NECP message having an MD5 format hashing checksum procedure, and in response thereto, decrypting, at the router, the encrypted NECP message by applying an MD5 format verification procedure to the message, and initiating, at the router, a listening process at a predetermined port thereon, the listening process including enabling a User Datagram Protocol (UDP) server process at the predetermined port;

establishing a time limit for receiving a server request at the predetermined port at which time the predetermined port is enabled; and receiving the server request at the predetermined port when the server request is received while the predetermined port is enabled.

22. The computer readable medium as set forth in claim 21 wherein the instruction for establishing includes instructing, from a client, in communication with the router, the time interval within which the UDP server process is active.

23. The computer readable medium as set forth in claim 22 wherein the instruction for transmitting the NECP message includes transmitting an encrypted NECP message and decrypting the encrypted NECP message at the destination router.

24. The computer readable medium as set forth in claim 23 wherein the instruction for decrypting includes accessing a decryption key provided based upon an encryption enabler associated with the router.

25. Computer readable media, comprising: said computer readable media containing instructions for execution in a processor for the practice of the method, receiving, at a default responder port of the destination router, a control protocol message sent by the source router, the message comprising a Network Endpoint Connection Protocol (NECP) message encapsulating a Command Length Status Data (CLSD) message therein, and when the NECP message is unencrypted, accessing an Access Control List (ACL) to determine whether a specified client is authorized, based upon information in the ACL, to utilize the default responder port, and in response to receipt of the CLSD message, initiating, at the destination router, a listening process at a predetermined port thereon, the listening process including enabling a User Datagram Protocol (UDP) server process at the predetermined port:

establishing a time limit for receiving a server request at the predetermined port at which time the predetermined port is enabled; and receiving the server request at the predetermined port when the server request is received while the predetermined port is enabled.

26. Electromagnetic signals propagating on a computer network, comprising: said electromagnetic signals carrying instructions for execution on a processor for the practice of the method, receiving, at a default responder port of the destination router, a control protocol message sent by the source router, the message comprising a Network Endpoint Connection Protocol (NECP) message encapsulating a Command Length Status Data (CLSD) message therein, and when the NECP message is unencrypted, accessing an Access Control List (ACL) to determine whether a specified client is authorized, based upon information in the ACL, to utilize the default responder port, and in response to receipt of the CLSD message, initiating, at the destination router, a listening process at a predetermined port thereon, the listening process including enabling a User Datagram Protocol (UDP) server process at the predetermined port;

establishing a time limit for receiving a server request at the predetermined port at which time the predetermined port is enabled; and receiving the server request at the predetermined port when the server request is received while the predetermined port is enabled.

27. Computer readable media, comprising: said computer readable media containing instructions for execution in a processor for the practice of the method, receiving, at a default responder port of the destination router, a control protocol message sent by the source router, the message comprising an encrypted Network Endpoint Connection Protocol (NECP) message encapsulating a Command Length Status Data (CLSD) message therein, the NECP message having an MD5 format hashing checksum procedure, and in response to receipt of the CLSD message, decrypting, at the destination router, the encrypted NECP message by applying an MD5 format verification procedure to the message, and initiating, at the destination router, a listening process at a predetermined port thereon, the listening process including enabling a User Datagram Protocol (UDP) server process at the predetermined port;

establishing a time limit for receiving a server request at the predetermined port at which time the predetermined port is enabled; and receiving the server request at the predetermined port when the server request is received while the predetermined port is enabled.

28. Electromagnetic signals propagating on a computer network, comprising: said electromagnetic signals carrying instructions for execution on a processor for the practice of the method, receiving, at a default responder port of the destination router, a control protocol message sent by the source router, the message comprising an encrypted Network Endpoint Connection Protocol (NECP) message encapsulating a Command Length Status Data (CLSD) message therein, the NECP message having an MD5 format hashing checksum procedure, and in response to receipt of the CLSD message, decrypting, at the destination router, the encrypted NECP message by applying an MD5 format verification procedure to the message, and initiating, at the destination router, a listening process at a predetermined port thereon, the listening process including enabling a User Datagram Protocol (UDP) server process at the predetermined port;

establishing a time limit for receiving a server request at the predetermined port at which time the predetermined port is enabled; and receiving the server request at the predetermined port when the server request is received while the predetermined port is enabled.

* * * * *

UNITED STATES PATENT AND TRADEMARK OFFICE
CERTIFICATE OF CORRECTION

PATENT NO. : 6,662,223 B1
DATED : December 9, 2003
INVENTOR(S) : Kui Zhang et al.

It is certified that error appears in the above-identified patent and that said Letters Patent is hereby corrected as shown below:

<u>Title page,</u>
Item [75], Inventors, add the following omitted inventor:
-- Frank G. Bordonaro, Los Gatos, California (US) --

Signed and Sealed this

Thirteenth Day of April, 2004

JON W. DUDAS
*Acting Director of the United States Patent and Trademark Office*